US012645726B2

(12) United States Patent
Sajjad et al.

(10) Patent No.: US 12,645,726 B2
(45) Date of Patent: Jun. 2, 2026

(54) LATENT CONCEPT ANALYSIS METHOD

(71) Applicant: Qatar Foundation for Education, Science and Community Development, Doha (QA)

(72) Inventors: Hassan Sajjad, Doha (QA); Fahim Dalvi, Doha (QA); Firoj Alam, Doha (QA); Nadir Durrani, Doha (QA); Abdul Rafae Khan, Doha (QA); Jia Xu, Doha (QA)

(73) Assignee: HAMAD BIN KHALIFA UNIVERSITY, Doha (QA)

( * ) Notice: Subject to any disclaimer, the term of this patent is extended or adjusted under 35 U.S.C. 154(b) by 0 days.

(21) Appl. No.: 18/132,224

(22) Filed: Apr. 7, 2023

(65) Prior Publication Data

US 2023/0325426 A1      Oct. 12, 2023

Related U.S. Application Data

(60) Provisional application No. 63/328,498, filed on Apr. 7, 2022.

(51) Int. Cl.
  *G06F 16/35* (2025.01)
  *G06F 16/38* (2019.01)
(52) U.S. Cl.
  CPC .............. *G06F 16/35* (2019.01); *G06F 16/38* (2019.01)
(58) Field of Classification Search
  CPC ................................. G06F 16/35; G06F 16/38
  See application file for complete search history.

(56) References Cited

U.S. PATENT DOCUMENTS

| | | | | |
|---|---|---|---|---|
| 6,625,585 B1 * | 9/2003 | MacCuish | .............. | G16C 20/64 |
| | | | | 706/11 |
| 6,658,624 B1 * | 12/2003 | Savitzky | ............... | G06F 40/221 |
| | | | | 707/E17.119 |
| 6,781,609 B1 * | 8/2004 | Barker | .................... | G06F 9/451 |
| | | | | 715/764 |
| 2003/0074369 A1 * | 4/2003 | Schuetze | ............... | G06F 16/904 |
| 2011/0225159 A1 * | 9/2011 | Murray | ................. | G06F 16/358 |
| | | | | 707/739 |
| 2012/0117484 A1 * | 5/2012 | Convertino | .......... | G06Q 10/101 |
| | | | | 715/744 |
| 2016/0321617 A1 * | 11/2016 | Shastri | .................... | G06F 40/30 |
| 2017/0091692 A1 * | 3/2017 | Guo | ..................... | G06V 10/761 |
| 2017/0235820 A1 * | 8/2017 | Conrad | ................. | G06F 40/295 |
| | | | | 707/728 |
| 2021/0343411 A1 * | 11/2021 | Zhang | .................... | G06N 3/042 |
| 2022/0108195 A1 * | 4/2022 | Kehler | .................... | G06T 15/08 |

(Continued)

OTHER PUBLICATIONS

Xu et al.: "A Survey On Multi-Output Learning" (Google Scholar • arxiv.org • Xu D • IEEE transactions on neural networks and learning systems Published 2019, hereafter "Xu"). (Year: 2019).*

(Continued)

*Primary Examiner* — Kuen S Lu
(74) *Attorney, Agent, or Firm* — K&L Gates LLP

(57) ABSTRACT

A method of constructing a dataset for identifying a plurality of latent concepts in a Natural Language Processing model is provided. The method includes executing a clustering process on a first dataset, preparing a second dataset, defining a hierarchical concept tag-set from the second dataset, and annotating the hierarchical concept tag-set.

18 Claims, 2 Drawing Sheets

(56) References Cited

U.S. PATENT DOCUMENTS

2023/0315993 A1* 10/2023 Nieborowski .......... G06F 16/35
704/9

OTHER PUBLICATIONS

Anonymous; "Discovering Latent Concepts Learned in BERT"; conference paper at ICLR; 2022; (25 pages).

Xu, et al.; "A Survey on Multi-output Learning"; Cornell University; Oct. 2019; (21 pages).

Michael, et al.; "Asking without Telling: Exploring Latent Ontologies in Contextual Representations" ACL Anthology; Nov. 2020; (21 pages).

Mamou, et al.; "Emergence of Separable Manifolds in Deep Language Representations"; Proceedings of Machine Learning Research; vol. 119; Feb. 2023; (11 pages).

Jones, et al.; "Semantics-Based Machine Translation with Hyperedge Replacement Grammars" ACL Anthology; Dec. 2012; (18 pages).

Gowda, et al.; "Agglomerative clustering using the concept of mutual nearest neighbourhood"; ScienceDirect; vol. 10, Issue 2; 1978; (3 pages).

\* cited by examiner

LATENT CONCEPT ANALYSIS METHOD

CROSS-REFERENCES TO RELATED APPLICATIONS

The present disclosure claims priority to U.S. Provisional Patent Application 63/328,498 titled "LATENT CONCEPT ANALYSIS METHOD" having a filing date of Apr. 7, 2022, the entirety of which is incorporated herein.

BACKGROUND

Interpreting deep neural networks ("DNNs") is an important tool to help understand the functionality of a DNN, which can increase the chances of a successful deployment in real world applications. Within this area, researchers have focused on DNNs to interpret deep Natural Language Processing ("NLP") models and their ability to learn various pre-defined linguistic concepts, which include parts-of-speech tags and parts-of-speech semantic tags. In an example, researchers have relied on these pre-defined linguistic concepts to probe whether specific linguistic knowledge is learned in certain parts of a model.

However, researchers only study pre-defined concepts, ignoring any latent concepts that may fall within these models. By ignoring the latent concepts, a narrow view of the model is created. Further, researches introduce human bias in the selection of the pre-defined concepts, which may lead to misleading interpretations.

Accordingly, improved systems, methods, and devices for identifying latent concepts are needed.

SUMMARY

The present disclosure generally relates to systems, methods, and devices for identifying latent concepts in models.

In light of the present disclosure, and without limiting the scope of the disclosure in any way, in an aspect of the present disclosure, which may be combined with any other aspect listed herein unless specified otherwise, a method of constructing a dataset for identifying a plurality of latent concepts in a Natural Language Processing model is provided.

In an aspect of the present disclosure, which may be combined with any other aspect listed herein unless specified otherwise, a method of constructing a dataset for identifying a plurality of latent concepts in a Natural Language Processing model includes executing a clustering process on a first dataset, wherein the clustering process outputs a plurality of clusters; preparing a second dataset, wherein the second dataset is a portion of the first dataset; defining a hierarchical concept tag-set from the second dataset; and annotating the hierarchical concept tag-set.

In accordance with a second aspect of the present disclosure, which may be used in combination with any other aspect listed herein unless stated otherwise, the clustering process is an agglomerative hierarchical clustering method.

In accordance with a third aspect of the present disclosure, which may be used in combination with any other aspect listed herein unless stated otherwise, a minimum variance criterion is used in the clustering process.

In accordance with a fourth aspect of the present disclosure, which may be used in combination with any other aspect listed herein unless stated otherwise, the clustering process outputs a pre-defined number of clusters.

In accordance with a fifth aspect of the present disclosure, which may be used in combination with any other aspect listed herein unless stated otherwise, the second dataset is randomly selected from the first dataset.

In accordance with a sixth aspect of the present disclosure, which may be used in combination with any other aspect listed herein unless stated otherwise, preparing the second dataset includes extracting a plurality of contextualized representations and tokenizing a plurality of sentences.

In accordance with a seventh aspect of the present disclosure, which may be used in combination with any other aspect listed herein unless stated otherwise, a plurality of core language properties are used to define the hierarchical concept tag-set.

In accordance with an eighth aspect of the present disclosure, which may be used in combination with any other aspect listed herein unless stated otherwise, annotating the hierarchical concept tag-set includes identifying a meaning of each of the plurality of clusters, and combining a portion of the plurality of clusters based on the meaning identified.

In accordance with a ninth aspect of the present disclosure, which may be used in combination with any other aspect listed herein unless stated otherwise, a method of constructing a dataset for identifying a plurality of latent concepts in a Natural Language Processing model includes executing a clustering process on a first dataset, wherein the clustering process outputs a plurality of clusters; preparing a second dataset, wherein the second dataset is a portion of the first dataset; defining a hierarchical concept tag-set; annotating the hierarchical concept tag-set, outputting an annotated dataset; and executing a logistic regression classifier on the annotated dataset.

In accordance with a tenth aspect of the present disclosure, which may be used in combination with any other aspect listed herein unless stated otherwise, a threshold is used on the logistic regression classifier.

In accordance with an eleventh aspect of the present disclosure, which may be used in combination with any other aspect listed herein unless stated otherwise, the logistic regression classifier is trained on the first dataset, outputting a final dataset.

Additional features and advantages of the disclosed method and apparatus are described in, and will be apparent from, the following Detailed Description and the Figures. The features and advantages described herein are not all-inclusive and, in particular, many additional features and advantages will be apparent to one of ordinary skill in the art in view of the figures and description. Moreover, it should be noted that the language used in the specification has been principally selected for readability and instructional purposes, and not to limit the scope of the inventive subject matter.

BRIEF DESCRIPTION OF THE DRAWINGS

The accompanying figures depict various elements of the one or more embodiments of the present disclosure, and are not considered limiting of the scope of the present disclosure.

In the Figures, some elements may be shown not to scale with other elements so as to more clearly show the details. Additionally, like reference numbers are used, where possible, to indicate like elements throughout the several Figures.

FIGS. 2A-C illustrate example concepts, including (a) a cluster that has a lexical property; (b) a cluster that has a

Figure 1:
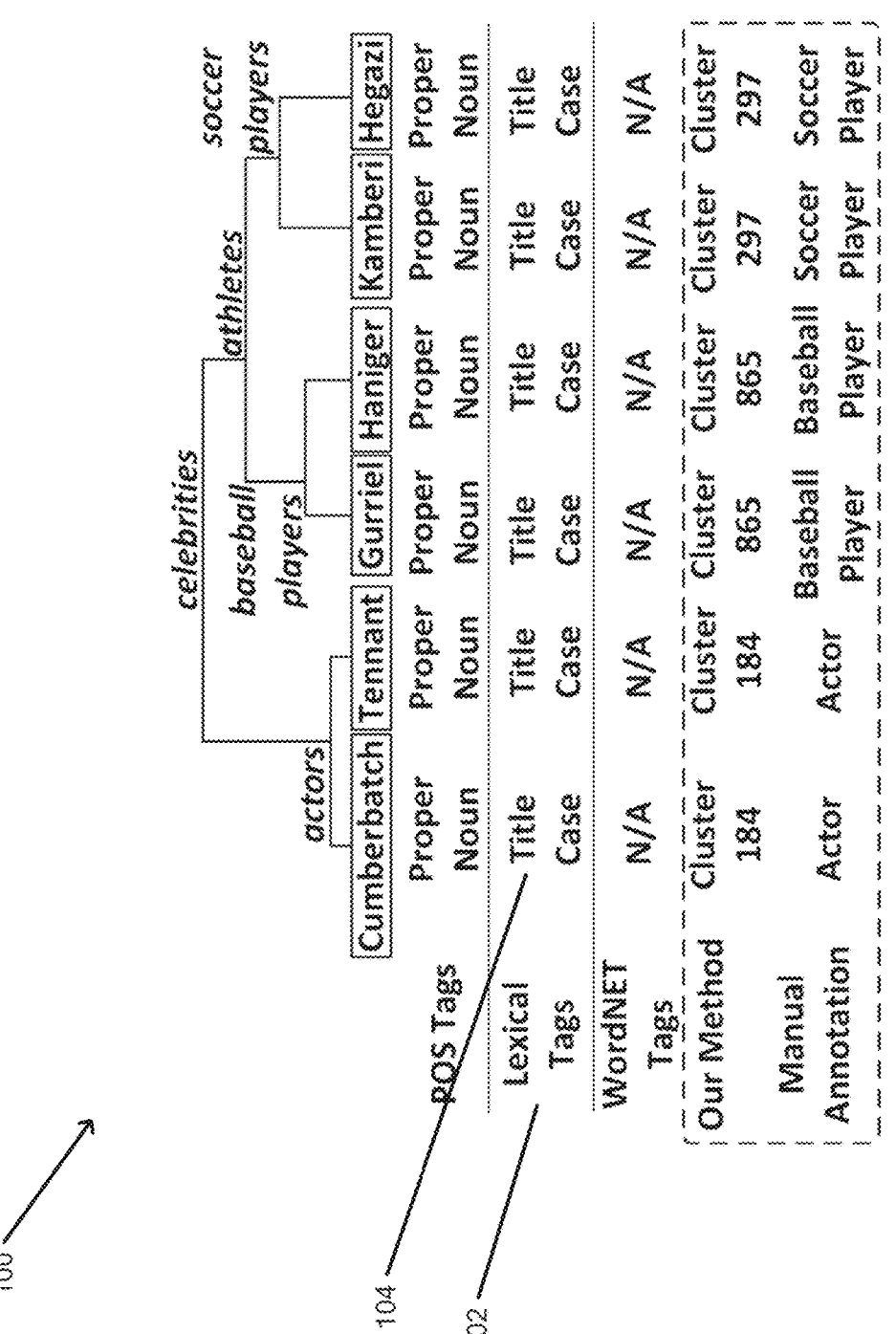
FIG. 1 illustrates a hierarchical concept tree, according to various examples of the present disclosure.

3 common suffix; and (c) a cluster that has fine-grained semantic information, according to various examples of the present disclosure.

DETAILED DESCRIPTION

By using DNNs to interpret deep NLP models, researchers only study pre-defined concepts, ignoring any latent concepts that may fall within these models. Therefore, by ignoring the latent concepts, researchers create a narrow view of the model with human bias, which may lead to misleading interpretations. Thus, aspects of the present disclosure may address the above-discussed disadvantages in the current process of relying on pre-defined concepts to study deep NLP models.

In general, a concept in language can be anything ranging from a shallow lexical property, such as character bigram, to a complex syntactic phenomenon, such as an adjectival phrase, or a semantic property, such as an event. In example embodiments, a concept is defined as a group of words that are meaningful (i.e. can be clustered based on a linguistic relation, such as lexical, semantic, syntactic, morphological etc.). In illustrative examples, names of ice-hockey teams form a semantic cluster; words that occur in a certain position of a sentence represent a syntactic concept; words that are first person singular verbs form a morphological cluster; and words that begin with "anti" form a lexical cluster.

In an example, latent concepts are represented by words that are grouped together in high dimensional space based on syntactic and sematic relationships. Thus, contextualized representations in high dimensional space can be clustered and analyzed using hierarchical clustering to identify groups of related words. For this process, a concept that enables model-centric interpretation dataset was created by manually annotating these groups. While the above steps were executed on the Bidirectional Encoder Representations from Transformers ("BERT") model, the method can be used and applied to any NAL models.

Further, clusters of word contextual representations in BERT may be considered concept candidates. And, human-annotated candidates with linguistic meanings are considered latent concepts. However, if a human is unable to identify a relationship behind a group of words, the cluster is considered an uninterpretable cluster. It is plausible that BERT learns a relation between words that humans are unable to comprehend.

To identify latent concepts in the BERT model, a dataset was constructed. In step one of constructing the dataset, a clustering method was executed. In an example embodiment, hidden nodes of each layer are clustered into K groups using agglomerative hierarchical clustering trained on the contextualized representation. Further, a minimum variance criterion is used, which minimizes the total within-cluster variance. Then, the distance between two vector representations is calculated with the squared Euclidean distance. The number of clusters, K, is a hyper-parameter. In an example, K was set to 1000 with an aim to avoid clusters of more than 1000 tokens (i.e. under-clustering) and to avoid a large number of small clusters having less than five word types (i.e. over-clustering). While K was set to 1000, the K value may be varied for any number of desired outcomes. Algorithm 1, shown below, is an illustrative example of the clustering method for constructing the dataset.

4

---

Algorithm 1: Learning Latent Concept with Clustering $\overrightarrow{y}^l$

Input: $\overrightarrow{y}^l$ = word representation of all running words
Parameter: K = No. of output clusters
  1:        for each word $w_i$ do
  2:          assign $w_i$ to cluster $c_i$
  3:        end for
  4:        while No. of clusters ≠ K do
  5:          for each cluster pair $c_i$, $c_{i'}$ do
  6:            $d_{i,i'}$ = inner-cluster difference of combined cluster $c_{i'}$ and $c_{i'}$
  7:        end for
  8:        $c_j$, $c_{j'}$ = cluster pair with minimum Value of d
  9:        merge clusters $c_j$ and $c_{j'}$
 10:      end while

---

In step two, a data preparation step was executed. Namely, the method uses a subset of a large dataset of News 2018 WMT by randomly selecting 250,000 sentences from the dataset, resulting in approximately 5,000,000 tokens. The method then limits the number of tokens to approximately 210,000 by discarding singletons, closed-class words, and tokens with a frequency higher than 10. For every token, the method then extracts contextualized representations and embedding layer representations using a 12-layered BERT-base-cased model.

In various embodiments, the extracting process comprises tokenizing sentences using the Moses tokenizer and passing the tokenized sentences through the standard pipeline of the BERT model. Next, the method extracts layer-wise representations of each token. If the BERT tokenizer splits an input token into sub-words or multiple tokens, the method mean pools these tokens to create an embedding of the input token. For every layer, the tokens are clustered using their contextualized representations.

In step three, a concept labeling step was executed. In this step, the method defines a hierarchical concept-tagset, starting with the core language properties including, for example, semantics, parts-of-speech, lexical, and syntax. For each cluster, the method assigns the core properties that are represented by that cluster and further enriches the label with finer hierarchical information. In many embodiments, the core language properties are not mutually exclusive. For example, a cluster can belong to more than one core properties at the same time. In an illustrative example, consider a group of words mentioning first names of the football players of the German team with all of the names occurring at the start of a sentence. The following series of tags may be assigned to the cluster: (1) semantic: origin: Germany; (2) semantic: entertainment: sport: football; (3) semantic: named entity: person: first name; and (3) syntax: position: first word. As shown, the hierarchy at various levels is preserved, which can be used to combine clusters to analyze a larger group.

In step four, an annotation process is executed. In a number of embodiments, the method analyzes a cluster by determining whether (1) the cluster is meaningful and (2) whether two clusters can be combined to form a meaningful group. To determine whether the cluster is meaningful, the method defines the meaning of a concept. In an example, when the method determines that the cluster is meaningful, the method may further introduce a new concept label where it belongs or classify it into an appropriate existing concept label.

As the annotators annotate and finalize the concept labels, the concept labels are accumulated into an existing concept label set thereby adding them into the next round of annotations. To determine whether two clusters can be combined to form a meaningful group, the method identifies whether two sibling clusters can be also combined to form a meaningful super-cluster. For example, a cluster capturing Rock music bands in the US can be combined with its sibling that groups Rock music bands in the UK to form a Rock music bands cluster. Similarly, when the method determines that two clusters can be combined to form a meaningful group, the method assigns a concept label for the super-cluster. By showing contextual information, the method enables very fine-grained concepts: for example, named-entities:person can be classified into finer named-entities:person:Hollywood.

When executing the above steps, the following results were obtained. For step (1), 243 meaningful clusters and 36 non-meaningful clusters were found. For step (2), 142 clusters out of 187 clusters can form a meaningful cluster when combined with their siblings. The annotation process resulted in 174 unique concept labels from the 279 clusters. The high number of concept labels may be caused to the fine-grained distinctions and multi-facet nature of the clusters where a cluster can get more than one labels. The label set consists of 11 lexical labels, 10 morphological labels, 152 semantic labels, and one syntactic label. The semantic labels form the richest hierarchy where the next level of hierarchy consists of 42 labels, including: entertainment, sports, and geo-politics. Besides the quantitative results, the method also produces a concept hierarchy.

FIG. 1 illustrates an example of a resulting tree found by hierarchical clustering. Each node is a concept candidate. Different levels of fine-grained meanings of word groups are captured, which do not exist in pre-defined concepts. For example, an SEM or an NE tagger would mark a name as a person, but the discovery of latent concepts from the above example method demonstrates that BERT uses a finer hierarchy by further classifying the name as "baseball players", "soccer players", and "athletes." The annotation process previously introduced preserved such information and provided hierarchical labels, including: "semantic:named-entity:person:celebrity:actor" and "semantic:named-entity:person:athletes:soccer." Based on the multi-faceted nature of the latent clusters, many of them are annotated with more than one concept label.

Figure 2A:
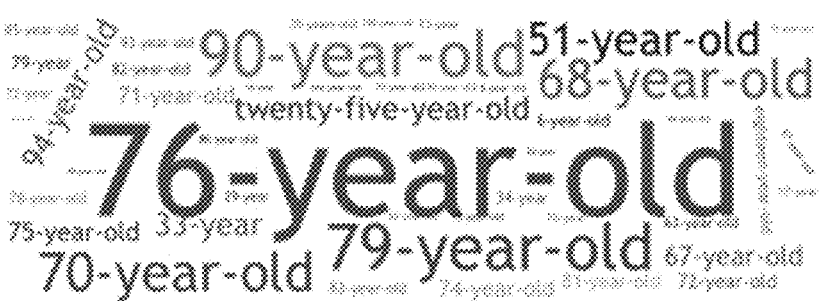
Figure 2B:
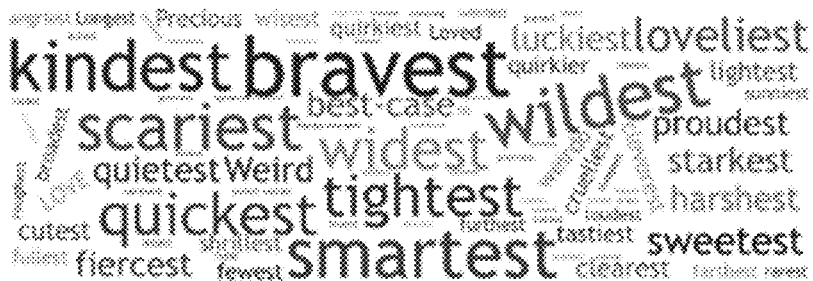
Figure 2C:

In the case of the clusters shown in FIG. 1, an example cluster 100 includes a common lexical property (102) as a title case (104) and hence will also get the label LEX:case: title during annotation. As discussed above, FIG. 1 represents aspects that are not found in pre-defined concepts. Further, FIG. 2 shows word clouds of a few annotated clusters along with their descriptions. FIG. 2 illustrates three word clouds: (a), (b), and (c). FIG. 2A comprises a cluster that has a lexical property; FIG. 2B comprises a cluster that has a common suffix; and FIG. 2C comprises a cluster that has fine-grained semantic information.

In various embodiments, a dataset was constructed using a supervised approach in addition to the earlier described manually labeled dataset. The dataset may be referred to as the BERT Conceptnet ("BCN") dataset. In an example embodiment, a logistic regression classifier was developed using Algorithm 2, shown below. The logistic regression classifier uses the manually annotated dataset to assign new tokens to given concept clusters.

---

Algorithm 2: Concept Prediction with Logistic regression

Input: $X_{train}$ = word representations for train data, $Y_{train}$ = cluster id from Algorithm 1.
$X_{test}$ = word representations for test data.
Parameter: t = probability threshold
1:      c = unique cluster id from $Y_{train}$
2:      M = train Logistic Regression model on $X_{train}$ and $Y_{train}$
3:      for each x ∈ $X_{test}$ do
4:      p = predict K probabilities for each Cluster using M and input x
5:      i = arg max p
6:      if $p_i$ >= t then
7:      assign t x to cluster id $c_i$
8:      end if
9:      end for

---

Then, the model was trained using 90% of the concept clusters to evaluate its performance on the remaining 10% concept clusters (i.e. the held-out set). The classifier achieved a precision score of 75% on the held-out set. In order to achieve higher precision, threshold t=0:97 on the confidence of the predicted cluster id, assigning new tokens to particular clusters only when the confidence of the classifier is higher than the threshold. This may enable better precision in cluster assignment to the new tokens, at the expense of discarding some potentially appropriate assignments, which can be offset by using more data for prediction.

Using the trained model, each token from the 2 million random sentences from the unused News 2018 dataset was labeled. The resulting dataset: BCN is a unique multi-faceted resource consisting of 174 concept labels with a total of 997,195 annotated instances. The average number of annotated instances per concept label is 5,731. The utility of this resource is not limited to interpretation, but can serve as a fine-grained dataset for NLP models. In various embodiments, the hierarchy present in the concept labels provides flexibility to use data with various granularity levels.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A method of constructing a dataset for identifying a plurality of latent concepts in a Natural Language Processing model, comprising:

executing a clustering process on a first dataset, wherein the clustering process outputs a plurality of clusters;

preparing a second dataset, separate from the first dataset, wherein the second dataset is a portion of the first dataset which comprises less than a totality of the first dataset;

tokenizing the second dataset into a plurality of tokens and extracting contextualized representations for each of the plurality of tokens, wherein input tokens of the plurality of tokens which are split into at least one of sub-words and multiple tokens are mean pooled to create an embedding for each input token;

defining a hierarchical concept tag-set from the second dataset using at least one core language property, wherein the at least one core language property includes syntax; and annotating the hierarchical concept tag-set comprising identifying a meaning of each of the plurality of clusters based on linguistic relation.

2. The method of claim 1, wherein the clustering process is an agglomerative hierarchical clustering method.

3. The method of claim 1, wherein a minimum variance criterion is used in the clustering process.

4. The method of claim 1, wherein the clustering process outputs a pre-defined number of clusters.

5. The method of claim 1, wherein the second dataset is randomly selected from the first dataset.

6. The method of claim 1, wherein preparing the second dataset comprises:

extracting a plurality of contextualized representations; and tokenizing a plurality of sentences.

7. The method of claim 1, wherein a plurality of core language properties are used to define the hierarchical concept tag-set.

8. The method of claim 1, wherein annotating the hierarchical concept tag-set further comprises:

combining a portion of the plurality of clusters based on the meaning identified.

9. A method of constructing a dataset for identifying a plurality of latent concepts in a Natural Language Processing model, comprising:

executing a clustering process on a first dataset, wherein the clustering process outputs a plurality of clusters;

preparing a second dataset, separate from the first dataset, wherein the second dataset is a portion of the first dataset which comprises less than a totality of the first dataset;

tokenizing the second dataset into a plurality of tokens and extracting contextualized representations for each of the plurality of tokens, wherein input tokens of the plurality of tokens which are split into at least one of sub-words and multiple tokens are mean pooled to create an embedding for each input token;

defining a hierarchical concept tag-set from the second dataset using at least one core language property, wherein the at least one core language property includes syntax;

annotating the hierarchical concept tag-set comprising identifying a meaning of each of the plurality of clusters based on linguistic relation, outputting an annotated dataset based on the annotated hierarchical concept tag-set; and executing a logistic regression classifier on the annotated dataset.

10. The method of claim 9, wherein a threshold is used on the logistic regression classifier.

11. The method of claim 9, wherein the logistic regression classifier is trained on the first dataset, outputting a final dataset.

12. The method of claim 9, wherein the clustering process is an agglomerative hierarchical clustering method.

13. The method of claim 9, wherein a minimum variance criterion is used in the clustering process.

14. The method of claim 9, wherein the clustering process outputs a pre-defined number of clusters.

15. The method of claim 9, wherein the second dataset is randomly selected from the first dataset.

16. The method of claim 9, wherein preparing the second dataset comprises:

extracting a plurality of contextualized representations; and tokenizing a plurality of sentences.

17. The method of claim 9, wherein a plurality of core language properties are used to define the hierarchical concept tag-set.

18. The method of claim 9, wherein annotating the hierarchical concept tag-set further comprises:

combining a portion of the plurality of clusters based on the meaning identified.

* * * * *